United States Patent
Lee et al.

(10) Patent No.: US 9,727,203 B2
(45) Date of Patent: Aug. 8, 2017

(54) FOLDABLE DISPLAY, FLEXIBLE DISPLAY AND ICON CONTROLLING METHOD

(71) Applicant: Industrial Technology Research Institute, Hsinchu (TW)

(72) Inventors: Wei-Yen Lee, Taichung (TW);
Sheng-Po Wang, Zongli (TW);
Chang-An Ho, Keelung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 604 days.

(21) Appl. No.: 14/151,376

(22) Filed: Jan. 9, 2014

(65) Prior Publication Data
US 2014/0223343 A1     Aug. 7, 2014

(30) Foreign Application Priority Data

Feb. 5, 2013 (TW) .............................. 102104335 A (51) Int. Cl.
*G06F 3/0488* (2013.01)
*G06F 3/0481* (2013.01)
*G06F 3/0482* (2013.01)

(52) U.S. Cl.
CPC ........ *G06F 3/04817* (2013.01); *G06F 3/0482* (2013.01); *G06F 2203/04803* (2013.01)

(58) Field of Classification Search
CPC .......... G06F 3/00; G06F 3/041; G06F 3/0412; G06F 3/048; G06F 3/0481; G06F 3/0482; G06F 3/0484; G06F 3/0486; G06F 3/0488; G06F 3/04817; G06F 3/04897; G06F 1/16; G06F 1/1616; G06F 1/1641; G06F 1/1649; G06F 1/1654; G06F 1/1677; G06F 1/1684; G06F 1/1694; H04M 1/02; H04M 1/022; H04M 1/0247; H04M 2250/12; H04M 2250/16
See application file for complete search history.

(56) References Cited

U.S. PATENT DOCUMENTS 6,268,857 B1 * 7/2001 Fishkin .................... G06F 1/16
                                                          345/156
2008/0301586 A1   12/2008 Ayatsuka et al.
(Continued)

FOREIGN PATENT DOCUMENTS

CN       1750109 A     3/2006
TW       535287 B      6/2003
(Continued)

OTHER PUBLICATIONS

Lahey, Byron et al., PaperPhone: Understanding the Use of Bend Gestures in Mobile Devices with Flexible Electronic Paper Displays, CHI 2011—Session: Flexible Grips & Gestures, May 7-12, 2011, pp. 1303-1312.
(Continued)

*Primary Examiner* — Xiomar L Bautista
(74) *Attorney, Agent, or Firm* — Muncy, Geissler, Olds & Lowe, P.C.

(57) ABSTRACT

A foldable display, a flexible display and an icon controlling method are provided. The icon controlling method may include the following steps. A detecting unit detects a displaying area of a display panel. A controlling unit changes a grouping level of multiple icons according to the displaying area.

18 Claims, 11 Drawing Sheets

(56) References Cited

U.S. PATENT DOCUMENTS

| | | |
|---|---|---|
| 2009/0044148 A1 | 2/2009 | Shirota |
| 2009/0164936 A1* | 6/2009 | Kawaguchi .......... G06F 3/0481 715/788 |
| 2010/0045705 A1 | 2/2010 | Vertegaal et al. |
| 2010/0122214 A1 | 5/2010 | Sengoku |
| 2010/0141605 A1 | 6/2010 | Kang et al. |
| 2010/0182265 A1* | 7/2010 | Kim ..................... G06F 1/1616 345/173 |
| 2011/0239163 A1* | 9/2011 | Mochizuki ........... G06F 3/0482 715/853 |
| 2012/0071208 A1* | 3/2012 | Lee .................. H04M 1/72544 455/566 |
| 2012/0162251 A1* | 6/2012 | Minamino ............ G11B 27/34 345/629 |
| 2012/0192110 A1* | 7/2012 | Wu ..................... G06F 3/04883 715/815 |
| 2013/0214995 A1* | 8/2013 | Lewin .................. G06F 3/1446 345/1.3 |
| 2014/0015743 A1* | 1/2014 | Seo ..................... G06F 1/1694 345/156 |
| 2014/0059492 A1* | 2/2014 | Hashida ............... G06F 3/0482 715/835 |
| 2014/0096047 A1* | 4/2014 | Ha ...................... G06F 3/04817 715/768 |
| 2014/0137041 A1* | 5/2014 | Jeon ..................... G06F 3/0482 715/815 |

FOREIGN PATENT DOCUMENTS

| | | |
|---|---|---|
| TW | I220622 | 8/2004 |
| TW | I224350 B | 11/2004 |
| TW | 200622979 A | 7/2006 |
| TW | M395341 | 12/2010 |
| TW | 201214368 A1 | 4/2012 |

OTHER PUBLICATIONS

Yoruk, Erdem et al., Shape-Based Hand Recognition, IEEE Transactions on Image Processing, Jul. 2006, pp. 1803-1815, vol. 15, No. 7.

Reneker, Darrell H. et al., Bending instability of electrically charged liquid jets of polymer solutions in electrospinning, Journal of Applied Physics, May 1, 2000, pp. 4531-4547, vol. 87, No. 9.

Holman, David et al., Organic user Interfaces: Designing Computers in any Way, Shape, or Form, Communications of the ACM, Jun. 2008, pp. 48-55, vol. 51, No. 6.

Balakrishnan Vimala et al., "Hand-Size Variations Effect on Mobile Phone Texting Satisfaction", Ubiquitous Computing and Communication Journal, Oct. 21, 2007, pp. 115-122, vol. 2, No. 5.

Murthy, G.R.S. et al., "Hand Gesture Recognition using Neural Networks", IEEE: $2^{nd}$ International Advance Computing Conference, 2010, pp. 134-138.

* cited by examiner

FOLDABLE DISPLAY, FLEXIBLE DISPLAY AND ICON CONTROLLING METHOD

This application claims the benefit of Taiwan application Serial No. 102104335, filed Feb. 5, 2013, the disclosure of which is incorporated by reference herein in its entirety.

TECHNICAL FIELD

The disclosure relates in general to a display and a controlling method, and relates to a foldable display, a flexible display and an icon controlling method.

BACKGROUND

Handheld electronic devices, such as smart handsets, portable pads and laptop computers, are important that one carries around in the modern daily life. With the explosive emergence of various applications for these handheld electronic devices, almost all of the handheld electronic devices are installed with quite a number of applications. These applications are generally presented as icons on a display panel. Therefore, an approach of displaying the numerous icons on a display panel is an influential factor that affects user-friendliness and user convenience of the handheld electronic devices.

SUMMARY

The disclosure is directed to a foldable display, a flexible display and an icon controlling method.

According to one embodiment, an icon controlling method is provided. The icon controlling method comprises the following steps. A detecting unit detects a displaying area of a display panel. A controlling unit changes a grouping level of a plurality of icons according to the displaying area.

According to another embodiment, an icon controlling method is provided. The icon controlling method comprises the following steps. A detecting unit detects a bending direction of a display. A controlling unit changes a grouping level of a plurality of icons according to the bending direction of the display panel.

According to an alternative embodiment, a foldable display is provided. The foldable display comprises a display panel, a detecting unit and a controlling unit. The display panel displays a plurality of icons, and changes a displaying area according to a folding condition of the foldable display. The detecting unit detects the displaying area. The controlling unit changes a grouping level of the icons according to the displaying area.

According to yet another embodiment, a flexible display is provided. The flexible display comprises a display panel, a detecting unit and a control unit. The display panel displays a plurality of icons. The detecting unit detects a bending direction of the display panel. The controlling unit changes a grouping level of the icons according to the bending direction of the display panel.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
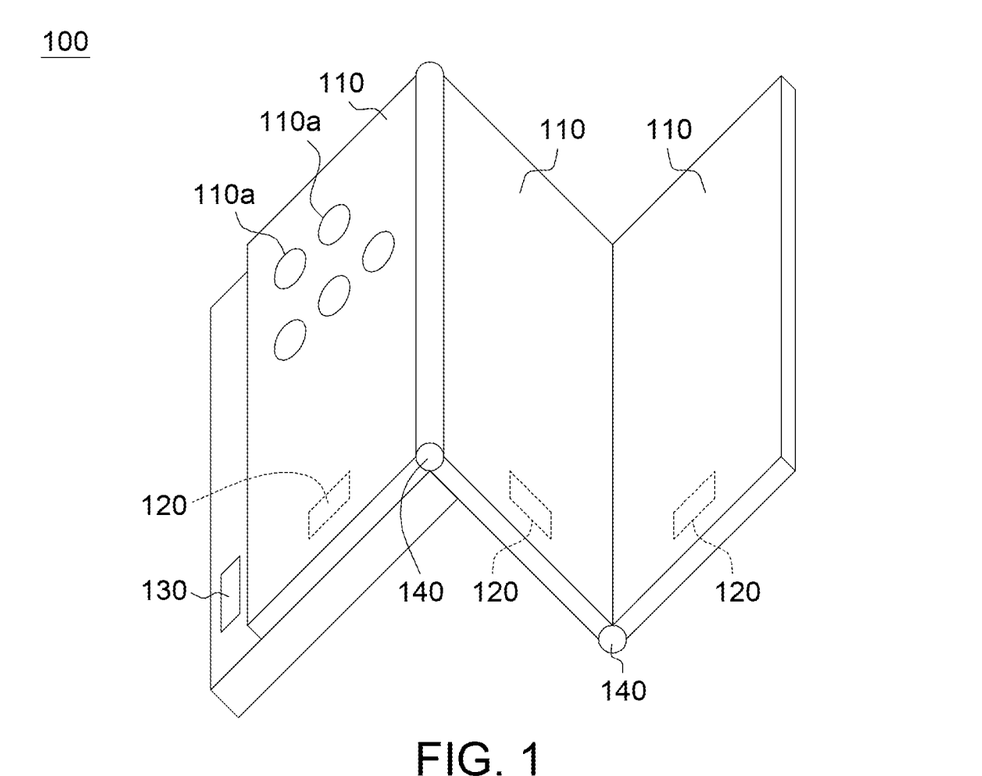
FIG. 1 is a schematic diagram of a foldable display according to an embodiment.

FIG. 1 shows a schematic diagram of a foldable display 100. The foldable display 100 at least comprises a display panel 110, a detecting unit 120 and a controlling unit 130. The display panel 110 may be a rigid display panel or a flexible display panel, such as a liquid-crystal display (LCD) panel or an organic light-emitting diode (OLED) display panel.

In the present embodiment, the display panel 110 displays a plurality of icons 110a, and changes a displaying area according to a folding condition of the foldable display 100. Referring to FIG. 1, the foldable display 100 has two rotation axes 140.

The detecting unit 120 performs status detection, and may be a contact detector, an infrared detector, a magnetic detector or a folding sensor. For example, the detecting unit 120 detects a folding condition of the foldable display 100 to know the size of the displaying area.

The controlling unit 130 performs various controlling procedures, and may be a circuit board, a processing chip or a storage medium storing a plurality of codes. The controlling unit 130 controls the display panel 110 according to a detection result of the detecting unit 120.

Through operations of the detecting unit 120 and the controlling unit 130, an approach for displaying the icons 110a by the display panel 110 can be appropriately controlled to enhance user-friendliness. Operations of the elements in the foldable display 100 are described below with reference to a flowchart.

Figure 2:
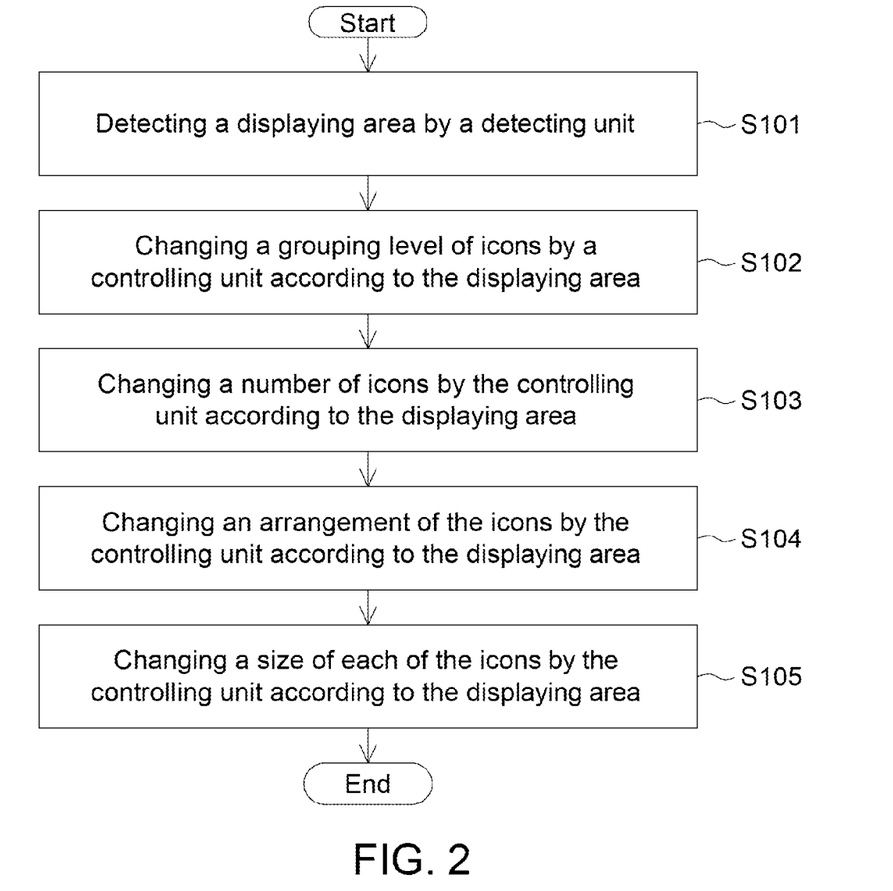
FIG. 2 is a flowchart of a controlling method for a foldable display according to an embodiment.

FIG. 2 shows a flowchart of a controlling method for the foldable display 100. In step S101, the detecting unit 120 detects a displaying area.

In step S102, the controlling unit 130 changes a grouping level of the icons 110a according to the displaying area.

Figure 3:
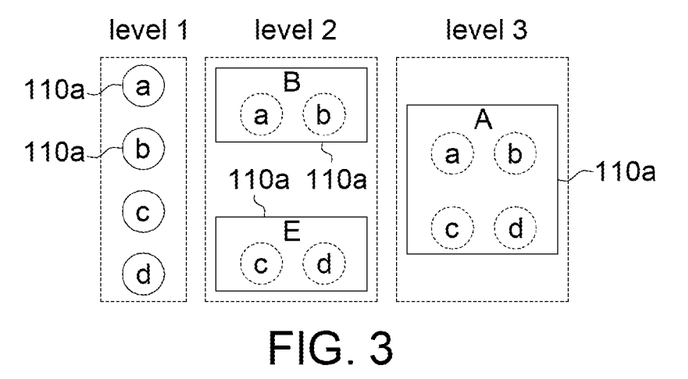
FIG. 3 is a schematic diagram of a grouping method based on characteristic values adopted by icons according to an embodiment.

FIG. 3 shows a schematic diagram of a grouping method based on characteristic values adopted by the icons 110a. In a level 1, the icons 110a labeled "a" have characteristics A, B and C.; the icons 110a labeled "b" have characteristics A, B and D; the icons 110a labeled "c" have characteristics A, E and F; the icons 110a labeled "d" have characteristics A, E and G.

As both of the icons 110a labeled "a" and "b" have the characteristic B, the icons 110a labeled "a" and "b" may be jointly labeled as "B" in a level 2. As both of the icons 110a labeled "c" and "d" have the characteristic "E", the icons 110a labeled "c" and "d" may be jointly labeled as "E" in the level 2.

As all of the icons 110a labeled "a", "b", "c" and "d" have the characteristic A, the icons 110a labeled "a", "b", "c" and "d" may be jointly labeled as "a" in a level 3.

Figure 4:
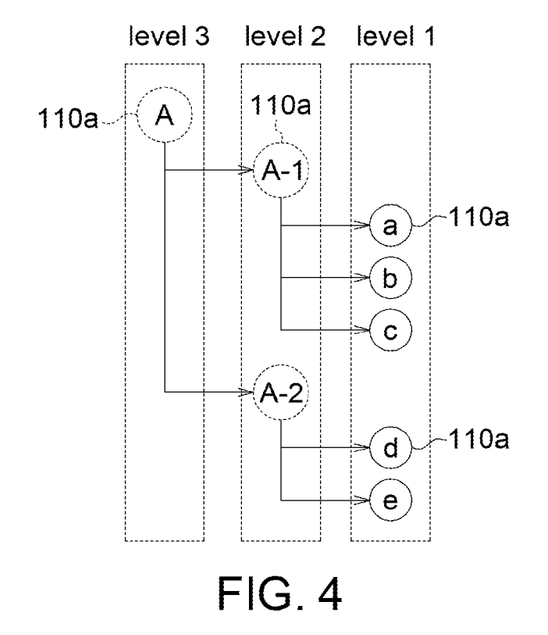
FIG. 4 is a schematic diagram of a database-based grouping method adopted by icons according to an embodiment.

FIG. 4 shows a schematic diagram of a database-based grouping method adopted by the icons 110a. The icons 110a may be defined by a database-based grouping method when the icons 110a are correlated by database indices. For example, the indices of the icons 110a labeled "a", "b" and "c" in the level 1 are the icons 110a labeled "A-1" in the level 2; the indices of the icons 110a labeled "d" and "e" are the icons 110a labeled "A-2" in the level 2; the indices of the icons 110a labeled "A-1" and "A-2" in the level 2 are the icon labeled "A" in the level 3.

Figure 5:
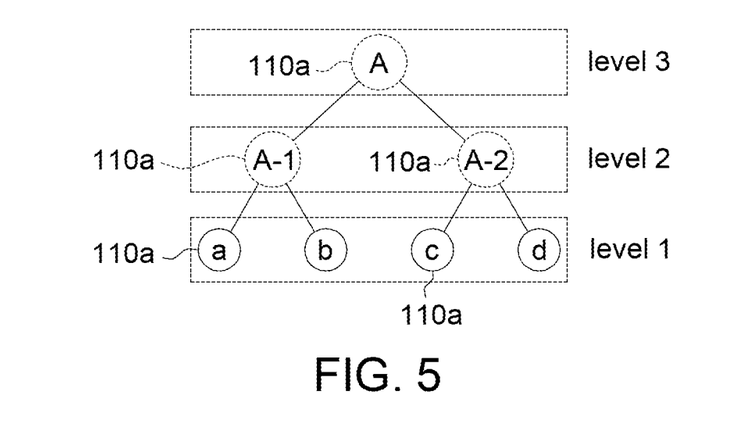
FIG. 5 is a schematic diagram of a tree-based grouping method adopted by icons according to an embodiment.

FIG. 5 shows a schematic diagram of a tree-based grouping method adopted by the icons 110a. The icons 110a may be defined by a tree-based grouping method when the icons 110a have a tree relationship. For example, a parent-node of the icons 110a labeled "a" and "b" in the level 1 is the icon 110a labeled "A-1" in the level 2; the parent-node of the icons 110a labeled "c" and "d" in the level 1 is the icon 110a labeled "A-2" in the level 2; a parent node of the icons 110a labeled "A-1" and "A-2" in the level 2 is the icon 110a labeled "A" in the level 3.

Figure 6:
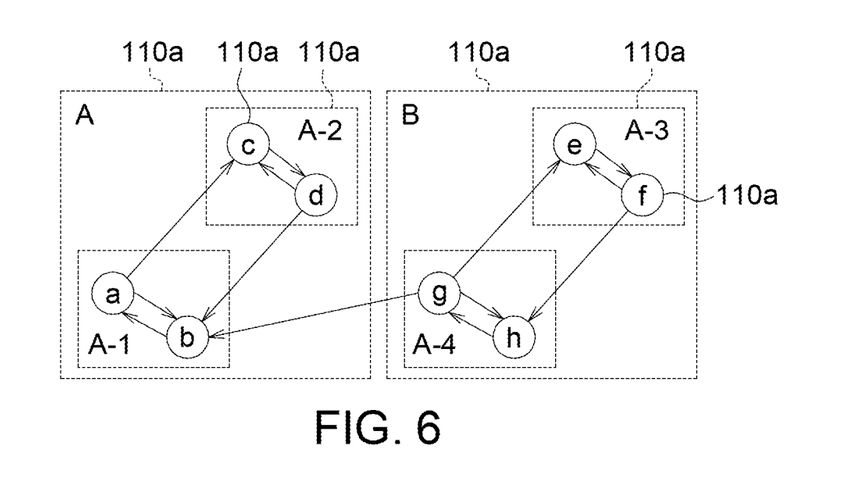
FIG. 6 is a schematic diagram of a nest-based grouping method adopted by icons according to an embodiment.

FIG. 6 shows a schematic diagram of a nest-based grouping method adopted by the icons 110a. The icons 110a may be defined by a nest-based grouping method when the icons have a nest relationship. For example, a nest group formed by the icons 110a labeled "a" and "b" in the level 1 are defined as the icon 110a labeled "A-1" in the level 2; a nest group formed by the icons "c" and "d" in the level 1 are defined as the icon 110a labeled "A-2" in the level 2; a nest group formed by the icons "e" and "f" in the level 1 are defined as the icon 110a labeled "A-3" in the level 2; a nest group formed by the icons 110a labeled "g" and "h" in the level 1 are defined as the icon 110a labeled "A-4" in the level 2; a nest group formed by the icons 110a labeled "A-1" and "A-2" in the level 2 are defined as the icon 110a labeled "A" in the level 3; a nest group formed by the icons 110a labeled "A-3" and "A-4" in the level 2 are defined as the icon 110a labeled "B" in the level 3.

In the above grouping methods adopted by the icons 110a, the icons 110a in the level 1 have the lowest grouping level, the icons 110a in the level 2 have a second lowest grouping level, and the icons 110a in the level 3 have a highest grouping level.

Figure 7:
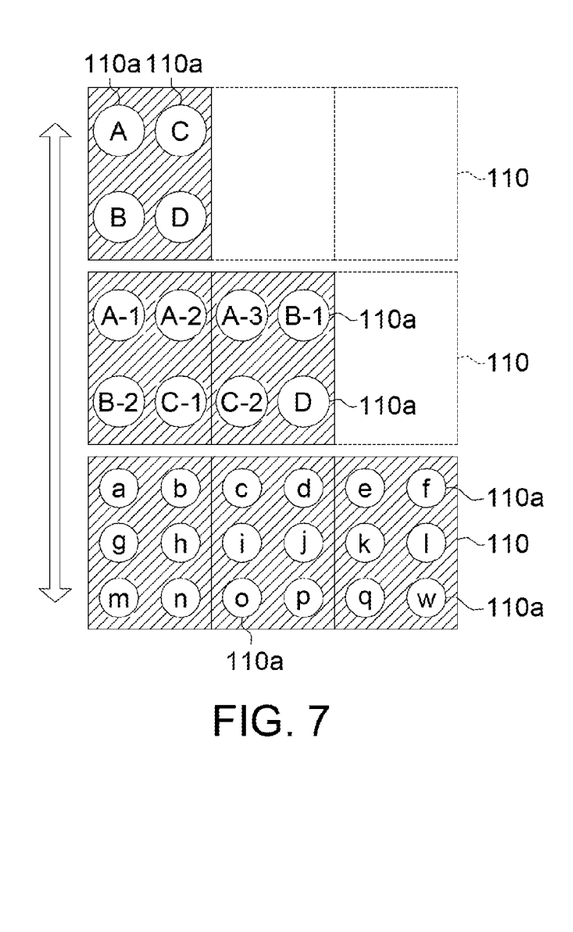
FIG. 7 is a schematic diagram of step S102 in FIG. 2 according to an embodiment.

FIG. 7 shows a schematic diagram of step S102 in FIG. 2 according to one embodiment. In step S102, the controlling unit 130 controls the grouping level of the icons 110a to lower as the displaying area expands. As shown in FIG. 7, when the displaying area is expanded to the largest, the controlling unit 130 controls the grouping level of the icons 110a to be lowered to the level 1. When the displaying area is the second largest, the controlling unit 130 controls the grouping level of the icons 110a to be raised to the level 2. When the displaying area is reduced to the smallest, the controlling unit 130 controls the grouping level of the icons 110a to be raised to the level 3.

In step S103, the controlling unit 130 further changes the number of the icons 110a according to the displaying area. More specifically, in step S103, the controlling unit 130 controls the number of the icons 110a to be increased as the displaying area expands. As shown in FIG. 7, when the displaying area is expanded to the largest, the controlling unit 130 controls the number of the icons 110a to be 18. When the displaying area is the second largest, the controlling unit 130 controls the number of the icons 110a to be 8. When the displaying area is reduced to the smallest, the controlling unit 130 controls the number of the icons 110a to be 4.

In an alternative embodiment, the controlling method for the foldable display 100 may be implemented by steps S101 and S103 while omitting other steps.

Figure 8:
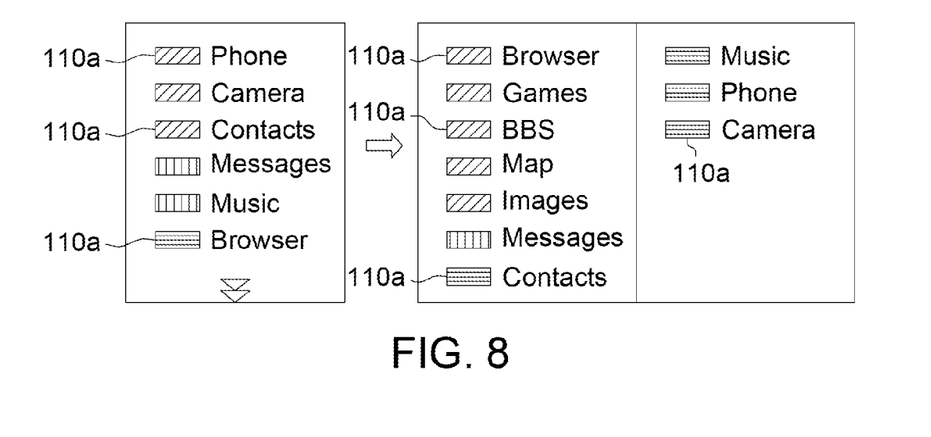
FIG. 8 is a schematic diagram of implementing steps S101 and S103 according to an embodiment.

In an embodiment, in step S103, the controlling unit 103 may change an arrangement sequence of the icons according to the displaying area. For example, FIG. 8 shows a schematic diagram of implementing steps S101 and S103. In the left of the diagram, the icons 110a have a first priority, with the icons 110a shaded by slanted lines having a highest priority, the icons 110a shaded by vertical lines having a second highest priority, and the icons 110a shaded by horizontal lines having a lowest priority. For example, applications such as phone, camera and contacts frequently utilized in small images are assigned with a highest priority. In the right of the diagrams, the icons 110a have a second priority, with the icons 110a shaded by slanted lines having a highest priority, the icons 110a shaded by vertical lines having a second highest priority, and the icons 110a shaded by horizontal lines having a lowest priority. For example, applications such as browsers, games, BBS, maps and graphics frequently utilized in large images are assigned with a highest priority.

In step S104, the controlling unit 130 changes an arrangement of the icons according to the displaying area. As shown in FIG. 7, when the displaying area is expanded to the largest, the controlling unit 130 controls the icons 110a to adopt a three-row arrangement. When the displaying area is expanded to the second largest, the controlling unit 130 controls the icons 110a to adopt a two-row arrangement.

Figure 9:
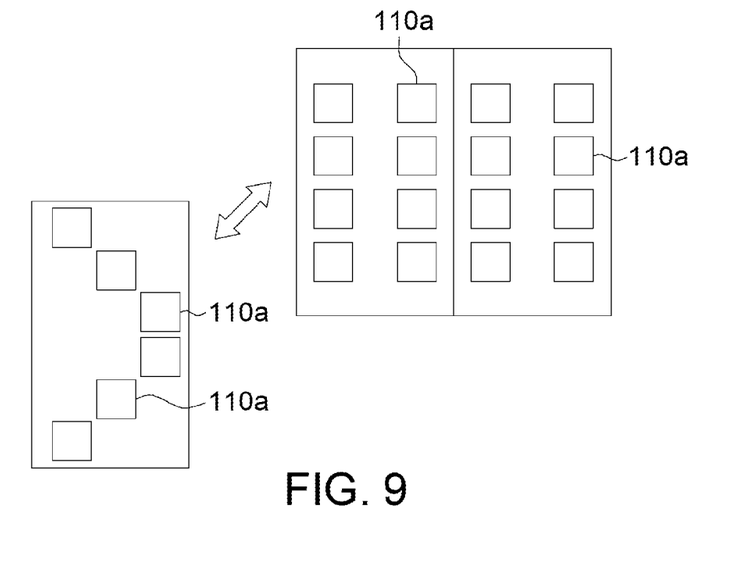
FIG. 9 is a schematic diagram of implementing steps S101 and S104 according to an embodiment.

In an embodiment, the controlling method for the foldable display 100 may be implemented by steps S101 and S104 while omitting other steps. Please refer to FIG. 9, which is a schematic diagram of implementing steps S101 and S104. For example, when the displaying area is quite large, the controlling unit 130 controls the icons 110a to adopt a matrix arrangement; when the displaying area is rather small, the controlling unit 130 controls the icons 110a to adopt a V-shaped arrangement.

In step S105, the controlling unit 130 changes a size of each of the icons 110a according to the displaying area. For example, in step S105, the controlling unit 130 may control the size of the icons 110a to be increased as the displaying area expands.

Figure 10:
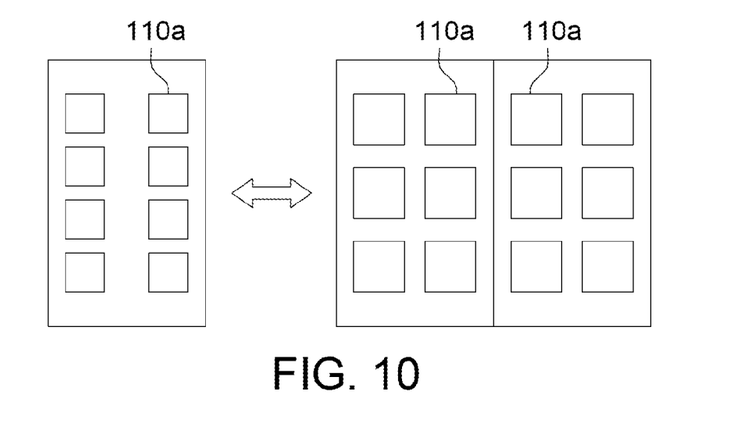
FIG. 10 is a schematic diagram of implementing steps S101 and S105 according to an embodiment.

In an embodiment, the controlling method for the foldable display 100 may be implemented by steps S101 and S105 while omitting other steps. FIG. 10 shows a schematic diagram of implementing steps S101 and S105. For example, as shown in FIG. 10, when the displaying area is quite large, the controlling unit 130 increases the size of the icons 110*a*; when the displaying area is small, the controlling unit 130 reduces the size of the icons 110*a*.

The above steps S102, S103, S104 and S105 may independently performed in coordination with step S101, or may be performed in any combination in coordination with step S101 according to actual design requirements.

In an embodiment, in addition to being controlled according to the displaying area, the icons 110*a* may also be controlled according to other conditions.

Figure 11:
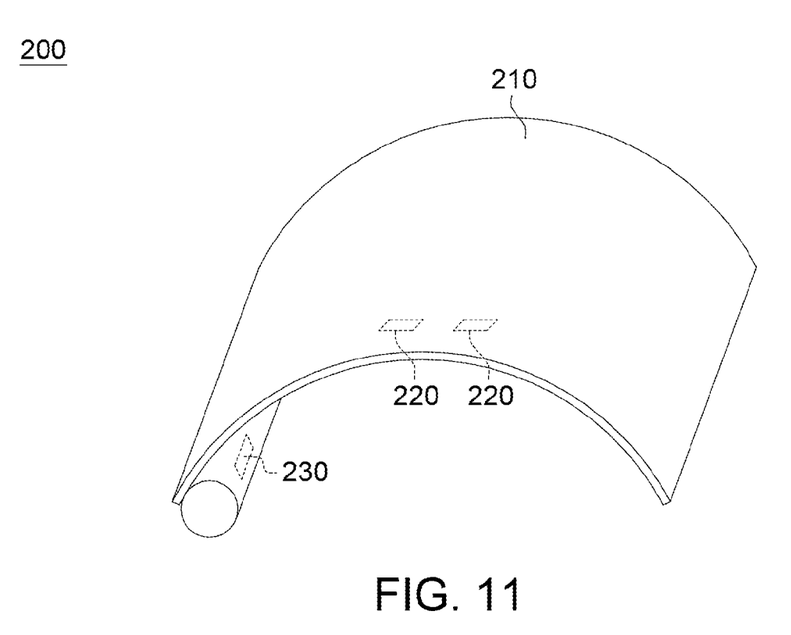
FIG. 11 is a schematic diagram of a flexible display according to an embodiment.

FIG. 11 shows a schematic diagram of a flexible display 200 according to an embodiment. Referring to FIG. 11, the flexible display 200 comprises a display panel 210, detecting units 220 and a controlling unit 230. The display panel 210 displays a plurality of icons 110*a*. The detecting unit 220 detects a bending direction of the display panel 210. The controlling unit 230 changes a grouping level of the icons 110*a* according to the bending direction of the display panel 210.

Figure 12:
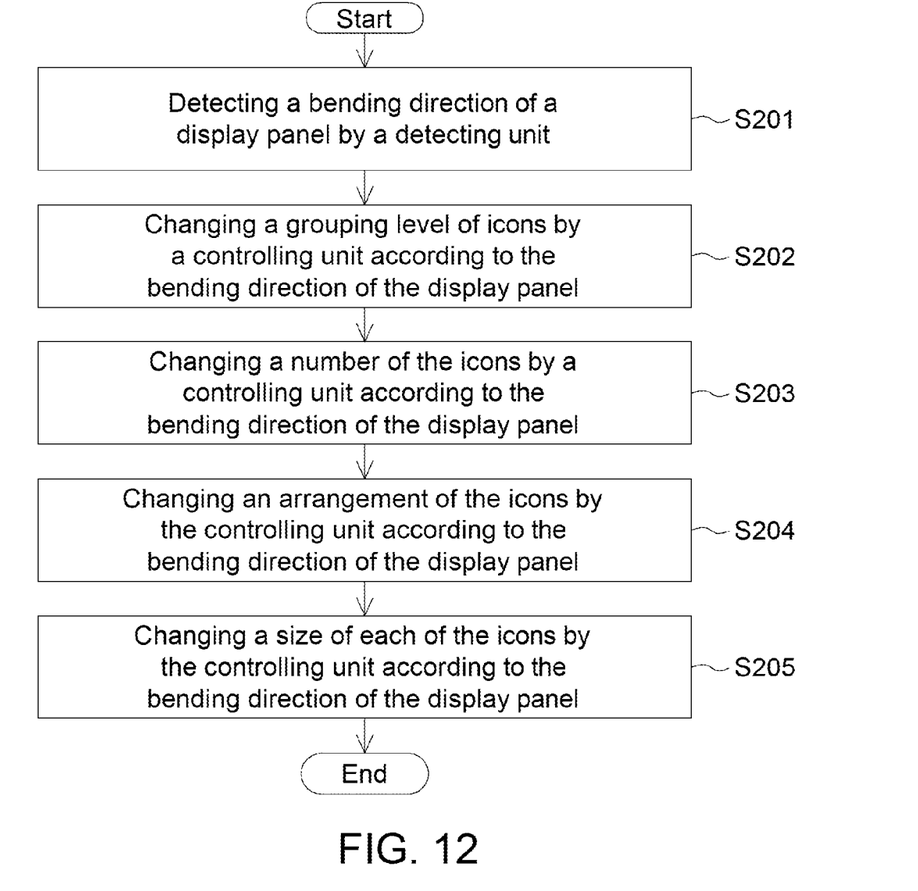
FIG. 12 is a flowchart of a controlling method for a flexible display according to an embodiment.

Operations of the elements in the flexible display 200 are described in detail with reference to a flowchart below. FIG. 12 shows a flowchart of a controlling method for the flexible display 200. In step S201, the detecting unit 220 detects a bending direction of the display panel 210. For example, the display panel 210 may be outward bended or inward bended.

In step S202, the controlling unit 230 changes the grouping level of the icons 110*a* according to the bending direction of the display panel 210. That is to say, upon bending the display panel 210, a user may observe a change in the grouping level of the icons 110*a* on the display panel 210.

Figure 13:
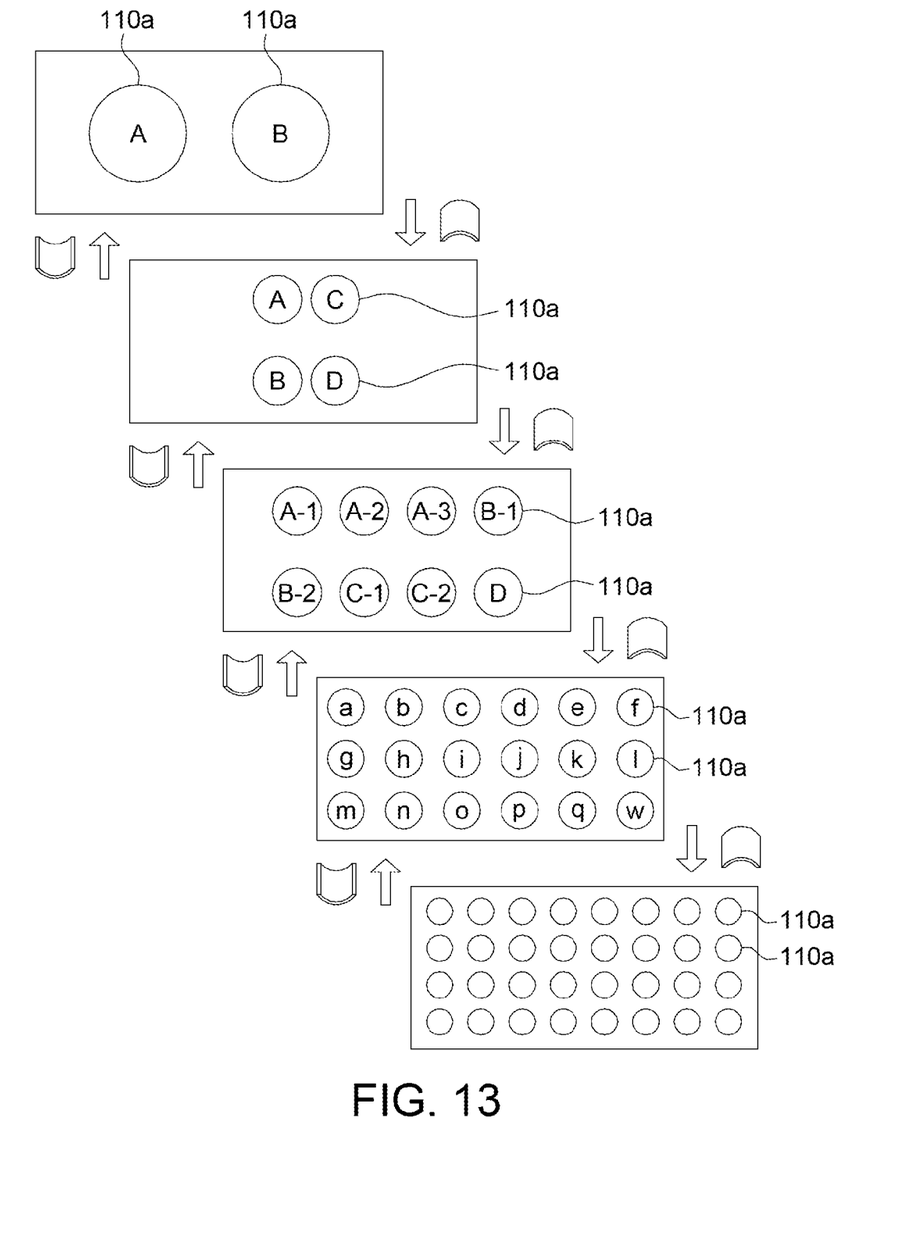
FIG. 13 is a schematic diagram of step S202 in FIG. 12.

FIG. 13 shows a schematic diagram of step S202 in FIG. 12. In step S202, when the display panel is outward bended, the controlling unit 230 lowers the grouping level of the icons 110*a*. As shown in FIG. 13, starting from the uppermost image, the grouping level of the icons 110*a* is lowered once each time the display panel 210 is outward bended. The lowermost image in FIG. 13 shows that the grouping level of the icons 110*a* is lowered by four times.

In step S202, when the display panel 210 is inward bended, the controlling unit 230 raises the grouping level of the icons 110*a*. As shown in FIG. 13, starting from the lowermost image, the grouping level of the icons 110*a* is raised once each time the display panel 210 is inward bended. The uppermost image in FIG. 13 shows that the grouping level of the icons 110*a* is raised by four times.

In addition to the above methods, the flexible display 200 may also change the number of the icons 110*a* by step S203. In step S203, the controlling unit 230 increases the number of the icons 110*a* when the display panel 210 is outward bended, or else reduces the number of the icons 110*a* when the display panel 210 is inward bended.

In addition to the above methods, the flexible display 200 may also change the arrangement of the icons 110*a* by step S204.

In addition to the above methods, the flexible display 200 may also change the size of the icons 110*a* by step S205. In step S205, the controlling unit 230 reduces the size of the icons 110*a* when the display panel 210 is outward bended, or else increases the size of the icons when the display panel 210 is inward bended.

The above steps S202, S203, S204 and S205 may independently performed in coordination with step S201, or may be performed in any combination in coordination with step S201 according to actual design requirements.

Figure 14:
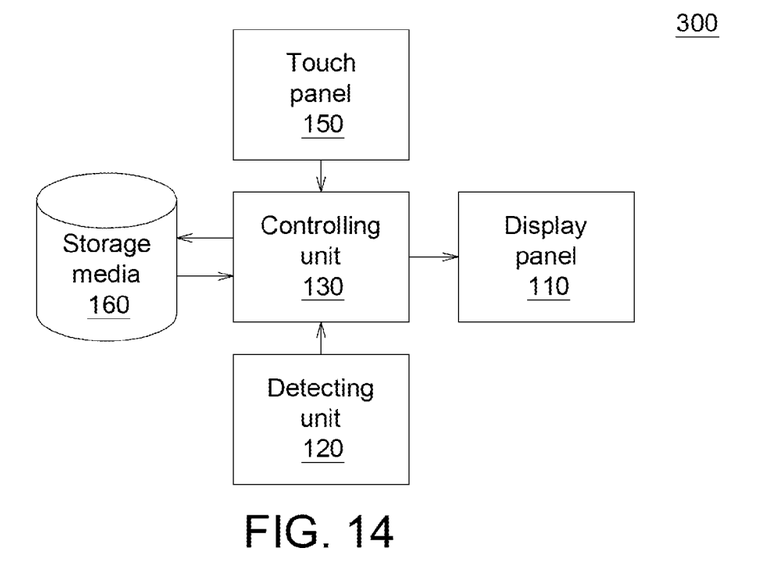
FIG. 14 is a block diagram of a foldable display according to an embodiment.

Please referring to FIG. 14, FIG. 14 is a block diagram of a foldable display 300. In one embodiment, the display panel 110 which is foldable can be configured into an electronic device, such as a mobile phone, a tablet computer or a foldable display. The foldable display 300 includes the display panel 110, the detecting unit 120, a touch panel 150, a storage media 160 and the controlling unit 130. The similar elements described above will not be repeated here. The touch panel 150 is for receiving a touching signal. The storage media 160 is for storing a first data to be shown on the display panel 110. The controlling unit 130 is further for controlling the display panel 110 according to the touching signal.

Figure 15:
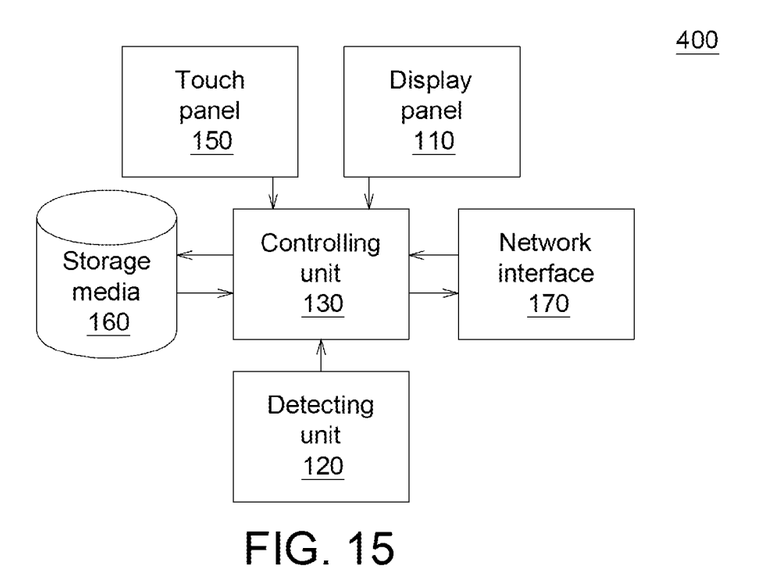
FIG. 15 is a block diagram of a foldable display according to an embodiment.

Please referring to FIG. 15, FIG. 15 is a block diagram of a foldable display 400. In one embodiment, the display panel 110 which is foldable can be configured into an electronic device, such as a mobile phone, a tablet computer or a foldable display 400. The foldable display 400 includes the display panel 110, the detecting unit 120, the touch panel 150, the storage media 160, the controlling unit 130 and a network interface 170. The similar elements described above will not be repeated here. The network interface 170 is for receiving a second data to be shown on the display panel 110.

Figure 16:
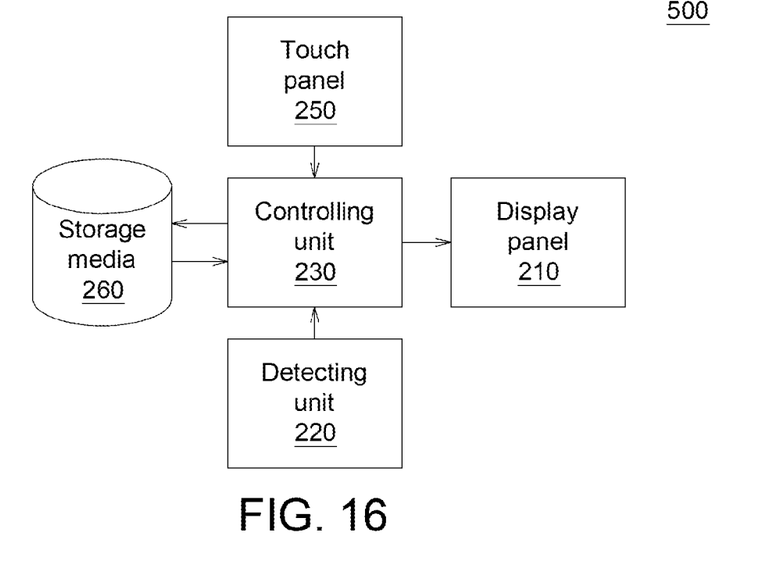
FIG. 16 is a block diagram of a flexible display according to an embodiment.

Please referring to FIG. 16, FIG. 16 is a block diagram of a flexible display 500. In one embodiment, the display panel 210 which is flexible can be configured into an electronic device, such as a mobile phone, a tablet computer or a flexible display 500. The flexible display 500 includes the display panel 210, the detecting unit 220, a touch panel 250, a storage media 260 and the controlling unit 230. The similar elements described above will not be repeated here. The touch panel 250 is for receiving a touching signal. The storage media 260 is for storing a first data to be shown on the display panel 210. The controlling unit 230 is further for controlling the display panel 210 according to the touching signal.

Figure 17:
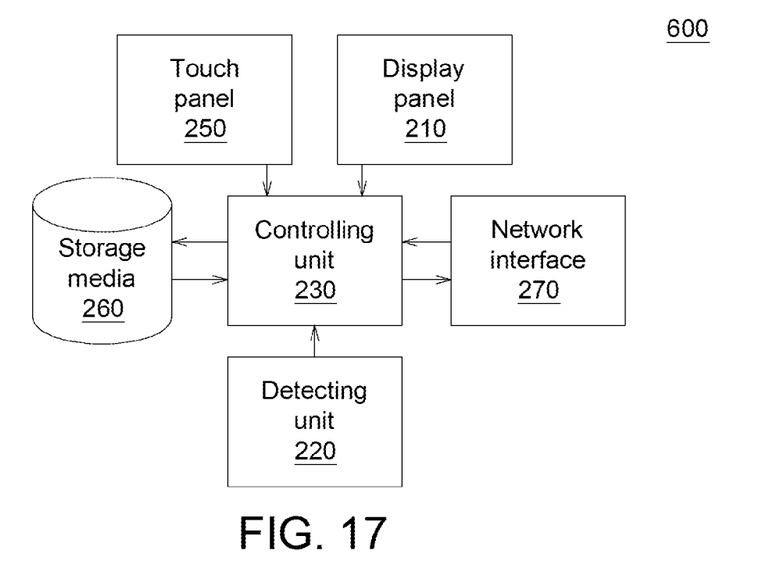
FIG. 17 is a block diagram of a flexible display according to an embodiment.

Please referring to FIG. 17, FIG. 17 is a block diagram of a flexible display 600. In one embodiment, the display panel 210 which is flexible can be configured into an electronic device, such as a mobile phone, a tablet computer or a flexible display 600. The flexible display 600 includes the display panel 210, the detecting unit 220, the touch panel 250, the storage media 260, the controlling unit 230 and a network interface 270. The similar elements described above will not be repeated here. The network interface 270 is for receiving a second data to be shown on the display panel 210.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:
1. An icon controlling method, comprising:
    detecting a size of a displaying area of a display panel by a detecting unit, wherein the display panel is one of a foldable display panel and a flexible display panel, and the display area changes based on a folded state or a flexed state of the display panel; and
    changing a grouping level of a plurality of icons by a controlling unit according to the size of the displaying area.

2. The icon controlling method according to claim 1, wherein in the step of changing the grouping level of the icons, the controlling unit controls the grouping level of the icons to be lowered as the displaying area expands.

3. The icon controlling method according to claim 1, further comprising:
   changing a number of the icons by the controlling unit according to the size of the displaying area.

4. The icon controlling method according to claim 3, wherein in the step of changing the number of the icons, the controlling unit controls the number of the icons to be increased as the displaying area expands.

5. The icon controlling method according to claim 3, wherein in the step of changing the number of the icons, the controlling unit changes an arrangement sequence of the icons according to the size of the displaying area.

6. The icon controlling method according to claim 1, further comprising:
   changing an arrangement of the icons by the controlling unit according to the size of the displaying area.

7. The icon controlling method according to claim 1, further comprising:
   changing a size of each of the icons by the controlling unit according to the size of the displaying area.

8. The icon controlling method according to claim 7, wherein in the step of changing the size of icons, the controlling unit controls the size of the icons to be increased as the displaying area expands.

9. A foldable display, comprising:
   a display panel, for displaying a plurality of icons, and changing a size of the a displaying area according to a folding condition of the foldable display, wherein the display area changes based on a folded state of the display panel;
   a detecting unit, for detecting the size of the displaying area; and
   a controlling unit, for changing a grouping level of the icons according to the size of the displaying area.

10. The foldable display according to claim 9, wherein the controlling unit controls the grouping level of the icons to be lowered as the displaying area expands.

11. The foldable display according to claim 9, wherein the controlling unit further changes a number of the icons according to the size of the displaying area.

12. The foldable display according to claim 11, wherein the controlling unit controls the number of the icons to be increased as the displaying area expands.

13. The foldable display according to claim 11, wherein the controlling unit changes an arrangement sequence of the icons according to the size of the displaying area.

14. The foldable display according to claim 9, wherein the controlling unit further changes an arrangement of the icons by the controlling unit according to the size of the displaying area.

15. The foldable display according to claim 9, wherein the controlling unit changes a size of each of the icons according to the size of the displaying area.

16. The foldable display according to claim 15, wherein the controlling unit controls the size of the icons to be increased as the displaying area expands.

17. The foldable display according to claim 9, further comprising:
   a touch panel, for receiving a touching signal; and
   a storage media, for storing a first data to be shown on the display panel;
   wherein the controlling unit is for controlling the display panel according to the touching signal.

18. The foldable display according to claim 17, further comprising:
   a network interface, for receiving a second data to be shown on the display panel.

* * * * *